Figure 2:
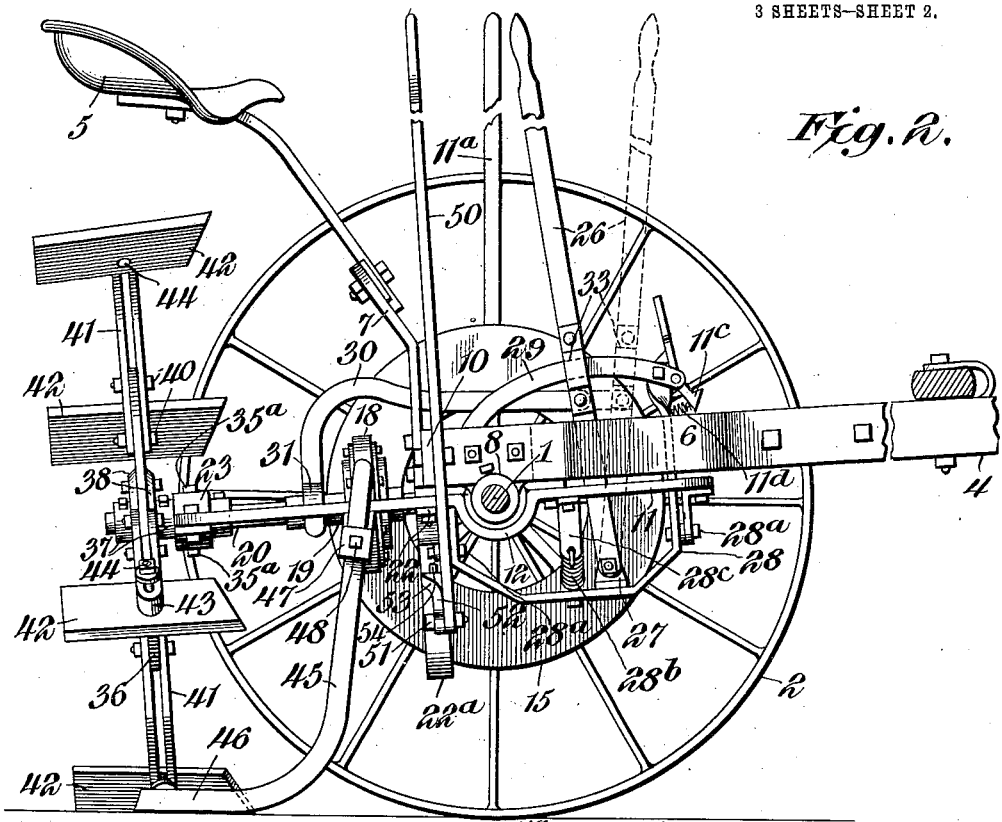

O. B. CARROLL.
COTTON CHOPPER.
APPLICATION FILED APR. 23, 1913.
1,095,812.
Patented May 5, 1914.
3 SHEETS—SHEET 1.
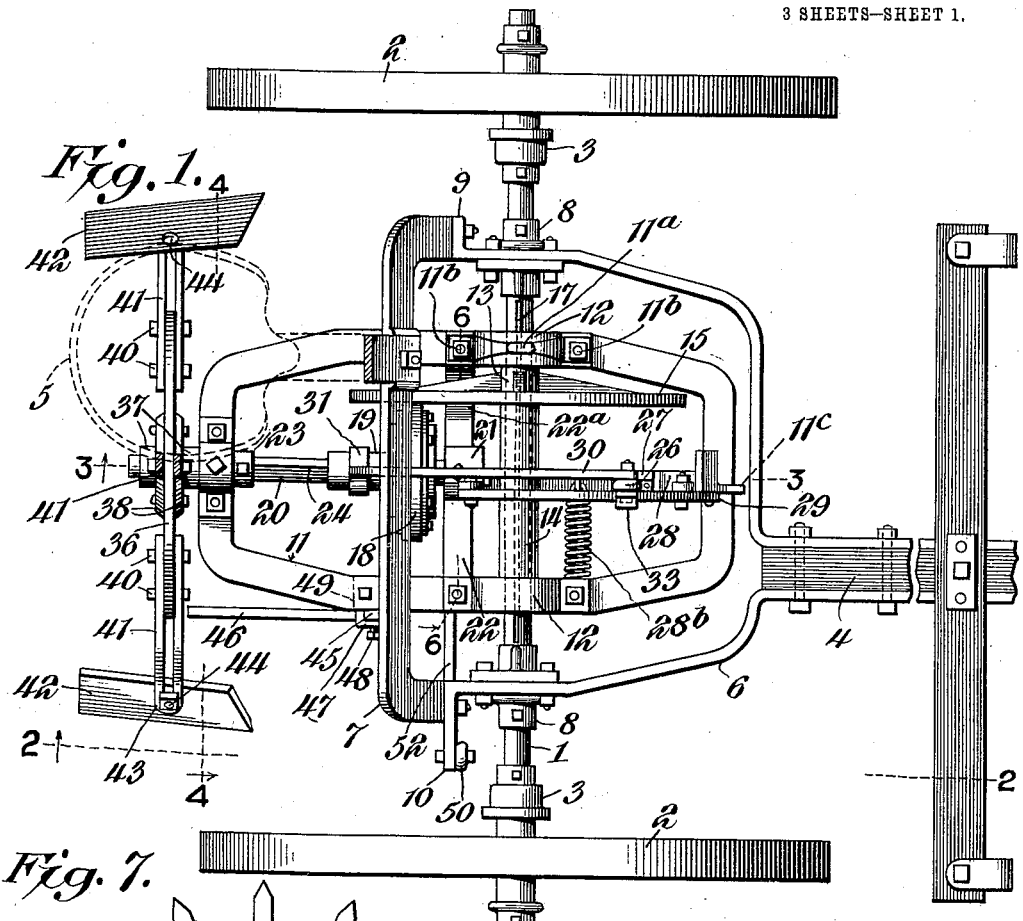
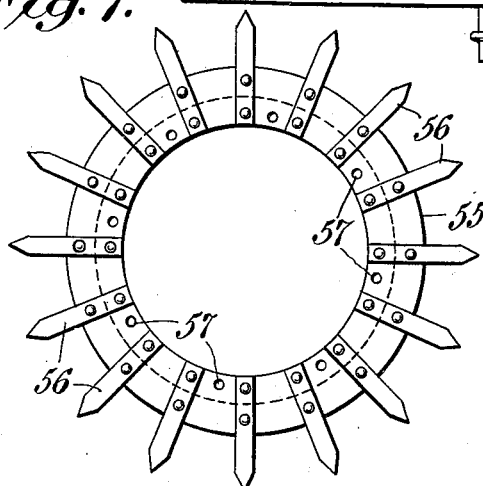
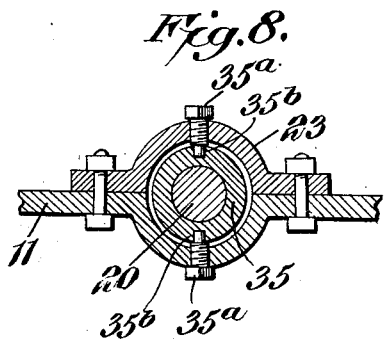
WITNESSES
Howard D. Orr
H. F. Riley
O. B. Carroll, INVENTOR,
BY E. G. Siggers
ATTORNEY
COLUMBIA PLANOGRAPH CO., WASHINGTON, D. C.

O. B. CARROLL.
COTTON CHOPPER.
APPLICATION FILED APR. 23, 1913.

1,095,812.

Patented May 5, 1914.
3 SHEETS—SHEET 2.

WITNESSES
Howard D. Orr
H. J. Riley

O. B. Carroll, INVENTOR,
BY E. G. Siggers
ATTORNEY

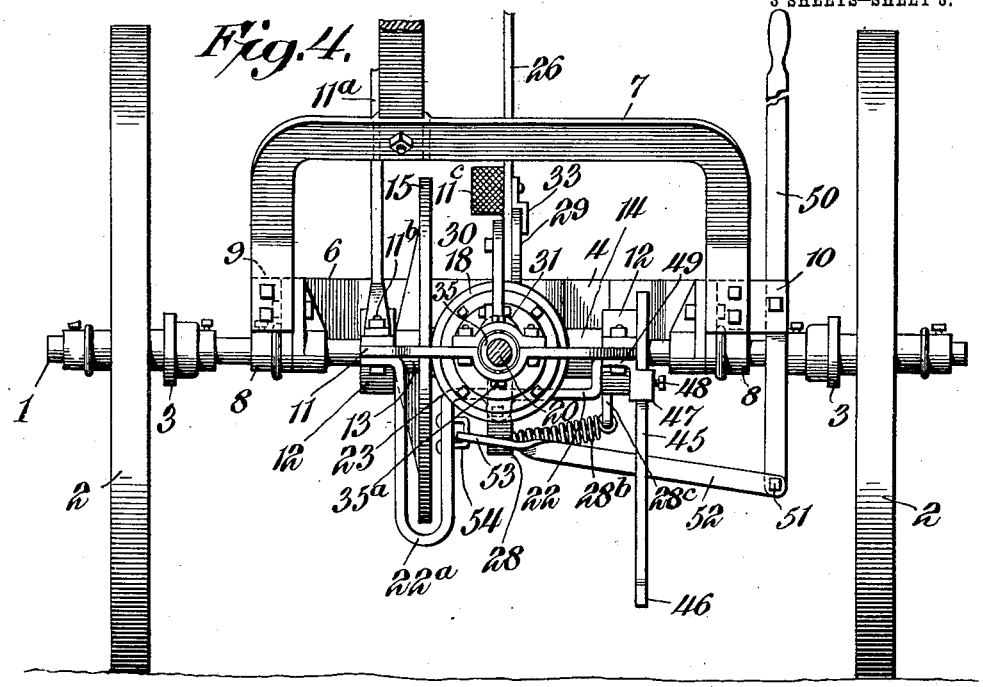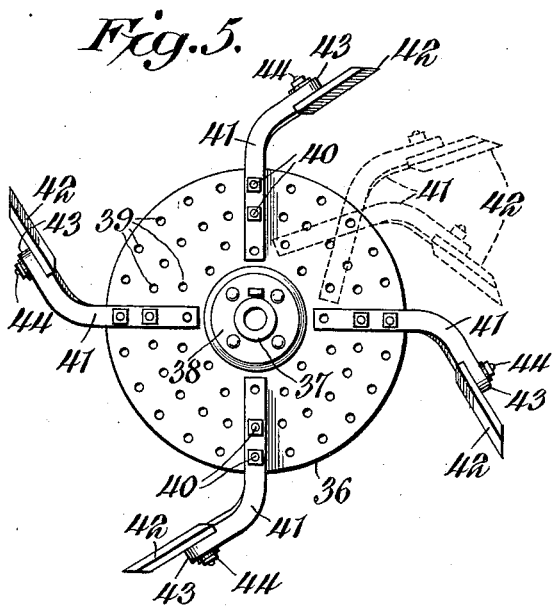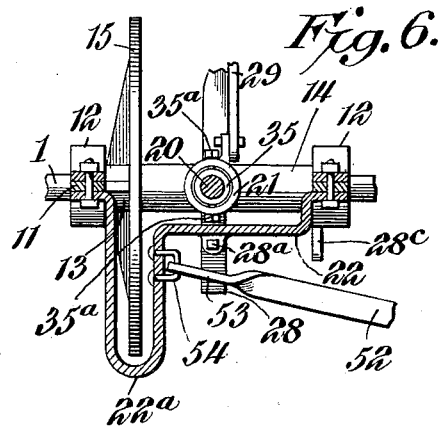

UNITED STATES PATENT OFFICE.

OSCAR BRUCE CARROLL, OF CAMERON, TEXAS.

COTTON-CHOPPER.

1,095,812.    Specification of Letters Patent.    Patented May 5, 1914.

Application filed April 23, 1913.    Serial No. 763,122.

*To all whom it may concern:*

Be it known that I, OSCAR BRUCE CARROLL, a citizen of the United States, residing at Cameron, in the county of Milam and State of Texas, have invented a new and useful Cotton-Chopper, of which the following is a specification.

The invention relates to improvements in cotton choppers.

The object of the present invention is to improve the construction of cotton choppers, and to provide a simple, efficient and comparatively inexpensive cotton chopper, adapted to be readily tilted and raised at the end of a row and while transferring the machine from one place to another, and capable of ready adjustment to arrange the cotton chopping mechanism for cutting the desired depth, and of automatically adjusting itself to the character of soil, so that the cotton chopping mechanism will operate at a uniform depth throughout the entire length of a row.

A further object of the invention is to provide a cotton chopper of this character, equipped with means for varying the speed of the cotton chopping mechanism and the consequent space between the plants left standing and for also shifting the chopping mechanism laterally of the machine for guiding it so as to enable the same to operate properly on irregular rows without changing the direction of the travel of the machine.

Another object of the invention is to provide a cotton chopper, adapted to be converted into an efficient rotary harrow, capable of cleaning the row better than an ordinary harrow and of operating on grass and weeds growing between the plants of a row and out of reach of the teeth of an ordinary harrow.

The invention also has for its object to provide a rotary harrow adapted for use after seed have been sown, and capable when the ground becomes crusted before the seed have grown up to travel over the row and break the crust.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 3:
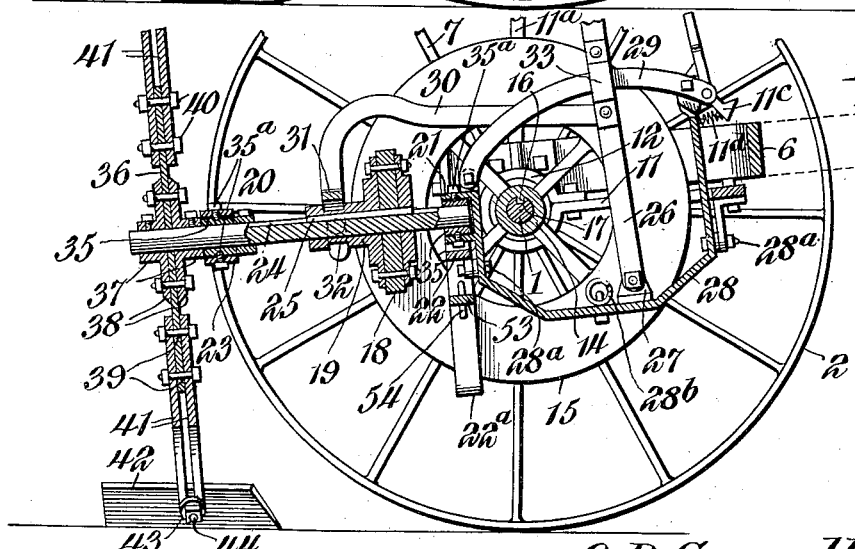

In the drawings: Figure 1 is a plan view of a cotton chopper, constructed in accordance with this invention, the seat standard being in section and the seat being shown in dotted lines. Fig. 2 is a sectional view on the line 2—2 of Fig. 1. Fig. 3 is a similar view on the line 3—3 of Fig. 1. Fig. 4 is a transverse sectional view, taken substantially on the line 4—4 of Fig. 1. Fig. 5 is a rear elevation of the rotary chopper. Fig. 6 is a detail transverse sectional view on the line 6—6 of Fig. 1. Fig. 7 is an elevation of the rotary soil engaging device for converting the machine into a harrow. Fig. 8 is an enlarged detail sectional view, illustrating the construction of the bearings for permitting a limited lateral oscillatory movement of the longitudinal chopper carrying shaft.

Like numerals of reference designate corresponding parts in all the figures of the drawings.

In the accompanying drawings in which is illustrated the preferred embodiment of the invention, 1 designates a rotary axle connected at its terminals with ground or supporting wheels 2 by clutches 3 of any suitable construction and operable in the ordinary manner to permit the wheels to rotate backwardly independently of the axle 1 when the machine is being backed or turned. As the construction of such clutches is well known in the art and as the particular construction of the same does not constitute any portion of the present invention, a detail illustration thereof is deemed unnecessary.

The axle has pivotally mounted on it an open main or supporting frame connected with a tongue 4 and carrying a seat 5, and comprising a front tongue yoke 6 and a rear approximately inverted U-shaped bar or member 7. The tongue yoke 6 is composed of two sides having forwardly extended terminals bolted or otherwise secured to the side edges or faces of the rear portion of the tongue, which is preferably arranged at one side of the center of the machine, so that when the latter is traveling over a row of plants, the tongue will not obstruct the view of the operator, who will thereby be afforded a clear view of the plants to enable him to guide the cotton chopping mechanism, as hereinafter fully explained, so that the same may be operated properly on irregular rows without changing the general direction of the machine.

The sides of the tongue yoke are provided with suitable transversely alined bearings to receive the axle, and they are held against lateral movement by set collars 8, suitably fixed to the axle and located at the outer faces of the sides of the tongue yoke, as clearly illustrated in Fig. 1 of the drawings. The rear terminals 9 and 10 of the sides of the tongue yoke are bent laterally and extend outwardly at right angles, and the sides of the U-shaped rear portion 7 of the main frame are secured at their lower ends to the terminals 9 and 10 and extend upwardly therefrom in a substantially vertical direction and have a slight angular bend between their ends to arrange the upper portion of the U-shaped frame 7 at an inclination, as clearly shown in Fig. 2 of the drawings. The seat 5, which is located in rear of the main frame, is provided with a standard secured to the U-shaped portion 7 at the opposite side of the center of the machine from the tongue to coöperate with the offsetting of the latter to afford to the operator a clear view of the plants operated on by the machine. The particular arrangement of the seat also enables the weight of the operator to partially counterbalance the weight of the tongue and thereby relieve the draft animals of such weight.

The axle also carries a tiltable laterally shiftable open frame 11 of substantially oblong form, constructed of suitable metal and composed of spaced sides and connecting front and rear ends and preferably tapered outwardly toward the latter to stiffen the sides of the frame. The sides of the frame are provided slightly in advance of the center with suitable bearings 12 of any preferred construction, receiving an outer hub portion 13, and an extended tubular portion or sleeve 14 of a vertical longitudinally disposed friction wheel 15. In practice the bearings 12 will be equipped with suitable antifriction devices for sustaining the end thrust of the outer hub portion and the tubular portion 14 of the friction wheel, but as any preferred form of bearing may be employed, illustration thereof is deemed unnecessary. The tubular portion or sleeve 14 may be cast integral with the wheel 15 and it constitutes an extended hub portion. The friction wheel 15 is slidably interlocked with the axle by means of a suitable key 16, operating in a groove or keyway 17 of the axle 1 and permitting the wheel and the frame to be shifted laterally of the machine, and at the same time preventing any independent rotary movement of the wheel 15 and the axle.

The friction wheel, which is designed to be constructed of cast metal, or other suitable material, has a flat inner side face against which bears a transversely disposed friction pinion 18, designed to be constructed with an engaging portion or section of paper or other suitable material. The friction pinion, which is provided at the rear side with an extended hub portion 19, is mounted on and slidably interlocked with a longitudinal shaft 20, journaled at its front end in a suitable bearing 21 of a laterally tiltable oscillatory bracket 28 and at its rear portion in a suitable bearing 23 at the rear end of the laterally shiftable frame 11. The laterally shiftable frame 11 is braced at a point intermediate of its ends by a transverse connecting bar 22, located in rear of the axle and suitably secured at its terminals to the sides of the frame 11. The transverse bar 22 is provided adjacent to the left hand side of the said frame 11 with an approximately U-shaped bend 22$^a$, which extends around and receives the lower portion of the friction wheel 15, as clearly illustrated in Fig. 4 of the drawings. The shaft 20 is provided with a longitudinal groove or keyway 24, in which slides a suitable key 25 of the friction pinion. The friction pinion is adapted to be shifted longitudinally of the shaft 20 to arrange it in different positions radially of the friction wheel 15 to vary the speed of the said longitudinal shaft 20 and the consequent cutting operation of a rotary chopper mounted on the rear end of the longitudinal shaft, but if desired the shaft 20 may be shifted longitudinally to effect this adjustment of the friction pinion, in which event the rotary chopper will move backwardly and forwardly with the shaft in the adjustment thereof. The friction pinion is also adapted to be shifted rearwardly beyond the friction wheel 15 when it is desired to stop the rotary movement of the chopper.

The adjustment of the friction pinion is effected by means of an upright lever 26, located in advance of the axle and pivoted at its lower end to a lug 27, which extends upwardly from the lower portion of the bracket 28. The bracket 28, which consists of an approximately vertical frame, is composed of top and bottom portions and front and rear upright connecting portions, located in advance and in rear of the axle, which passes through the open oscillatory laterally tiltable bracket 28, as clearly illustrated in Fig. 3 of the drawings. The bracket 28 is connected at the front and back with the front of the laterally shiftable frame 11 and with the transverse bar 22 thereof by front and rear longitudinally alined approximately horizontal pivots 28$^a$, mounted in suitable bearings and located at an intermediate portion between the top and bottom of the laterally tiltable bracket. The lever 26, which is guided by the top portion 29 of the bracket 28, is connected with the friction pinion by a substantially L-shaped link or bar 30, pivoted at its inner end to the lever 26 and having a depending downwardly extending arm 31 at its rear portion, forked or bifurcated at its lower end to straddle the extended hub portion 19 of the friction pinion and provided with means for engaging an annular groove 32 of the said extended hub portion 19. The top guiding bar 29 of the bracket 28 has an arcuate portion concentric with the pivot of the lever 26 for guiding the latter, and the said bar 29 extends through an opening formed by a loop 33, constructed of suitable material and secured to one of the side faces of the lever 26. When the lever 26 is oscillated, the friction pinion is moved along the shaft 20 and is adapted through such adjustment to be arranged in the desired position with relation to the friction wheel 15.

In the drawings, the front and rear upright portions of the bracket 28 are shown integral with the bottom connecting portions, and the terminals of the top bar 29 of the bracket are bolted to the upper ends of the front and rear connecting portions, but the bracket 28 may be constructed of a single piece of metal, or be made in any other suitable manner, as will be readily understood. The variable speed lever 26 is also capable of operation to tilt the upper portion of the bracket 28 either to the right or to the left to vary the frictional engagement between the friction pinion 18 and the friction wheel. The friction pinion is maintained yieldably in engagement with the friction wheel by a transversely disposed coiled spring $28^b$, connected at one end to the bottom portion of the bracket 28 by an eye bolt or other suitable fastening device and at its other end with the laterally shiftable frame 11 at the right hand side thereof. The frame 11 is provided at the right hand side with a depending arm or portion $28^c$ for the attachment of the outer end of the spring $28^b$. The coiled spring $28^b$ is connected with the bracket 28 below the pivotal point thereof, and it urges the lower portion to the right or outwardly away from the friction wheel, which is located at the left hand side of the machine. As the front end of the longitudinal shaft 20 is connected with the pivoted bracket or support 28 above the pivotal portion, the spring maintains the friction pinion normally in engagement with the friction wheel under a constant pressure, which may be varied by the lateral movement of the variable speed lever. The handle portion of the variable speed lever may be pressed either to the right or to the left, and when pressed to the left, it increases the frictional contact between the pinion and the friction wheel, which adapts the machine for heavy cutting. The frictional contact between the friction wheel 15 and the friction pinion 18 may be lessened by pressing the upper portion of the variable speed lever outwardly away from the friction wheel, and the rotation of the chopper may be stopped by forcing the friction pinion out of contact with the friction wheel. By this operation, an instant stopping of the cotton chopping mechanism may be had without adjusting the friction pinion rearwardly along the horizontal shaft 20 to a point beyond the friction wheel.

No claim is made in the present application to the frictional gearing.

In order to enable the shaft 20 to adjust itself to the lateral movement of the pivoted bracket 28, the front and rear bearings 21 and 23 preferably consist of inner bearing sleeves 35, pivotally mounted within outer supporting sleeves by upper and lower screws $35^a$, arranged in threaded perforations of the outer supporting sleeve and having smooth inner terminal portions, which engage upper and lower bearing recesses $35^b$ in the top and bottom portions of the bearing sleeves. The outer supporting sleeves of the bearings 21 and 23 are of sufficient size to permit the necessary lateral play of the longitudinal shaft 20.

The rotary chopper comprises in its construction a disk 36, constructed of suitable material and detachably secured to the rear end of the longitudinal shaft 20 at the rear end of the frame 11 by set collars 37, located at the front and rear faces of the disk 36 and provided with flanges 38, which are bolted or otherwise secured to the disk. The disk is provided with perforations 39, arranged at intervals circumferentially around the disk and also at different distances from the center of the disk, and adapted to receive bolts 40 for securing shanks 41 of cotton chopping blades or hoes 42 to the said disk. The shanks 41, which have angularly related outer portions to set the blades or hoes at an angle to the inner portions of the shanks, may be constructed in any suitable manner, and, as illustrated in the accompanying drawings, they are composed of spaced sides forming an outer loop 43 and arranged at the front and rear faces of the disk 36, as clearly illustrated in Figs. 1 and 2 of the drawings. The outer portions or loops 43 of the shanks receive bolts 44, or other suitable fastening means for securing the blades or hoes 42 to the shanks. The bolts 40 are preferably arranged in pairs, one of the bolts of each shank being adapted to form a pivot, while the other is adapted to be arranged in various perforations of the disk to change the position of the shank. By this adjustment, the hoes or blades may be set at different angles (see Fig. 5) and may be arranged to operate on the soil in the desired manner. The hoes or blades of the disk may be varied in number to arrange them the desired distance apart, which together with the variation in the speed of the longitudinal shaft of the cotton chopping mechanism will enable the desired number of plants of a row to be cut out and the remaining plants left standing at the desired intervals. The cotton chopping blades or hoes may be of any preferred construction, but they are preferably of the form shown. Their front ends are cut at an angle and inclined from front to rear, and this together with the angling position of the blades enables them to cut through the plants and soil with a clear cut, and by shaping the hoes or blades in this manner there is no right angled heel to knock off the plants after the point has passed.

The depth of cut of the chopping mechanism is regulated by means of a gage bar 45, constructed of suitable metal and consisting of an inclined upper portion and a rearwardly extended lower portion or foot 46, arranged to run on the ground. The foot 46 is curved upwardly at the front and is adapted to operate as a runner. The upper portion of the gage bar is adjustably connected to one of the sides of the laterally shiftable frame 11 at the rear portion thereof by means of a clamp 47, consisting of a sleeve set at an inclination and equipped at the outer side with a set screw 48 and provided at the inner side with an attaching arm 49, which is secured to the lower face of the adjacent side of the frame 11. The gage bar is adapted to be raised and lowered in the sleeve of the clamp 47, and the set screw 48 is adapted to engage the gage bar to secure the same in its adjustment. The laterally shiftable frame is pivotally mounted on the axle independently of the main frame, and its rear portion, which carries the rotary chopper, is heavier than the front portion, and the gage bar is adapted to rest normally upon the ground, being maintained in contact with the same by the heavier rear portion of the frame 11. The gage bar running along the ground is adapted to conform to the configuration thereof and operates to gage the machine and cause the chopping mechanism to cut at a uniform depth throughout the entire length of a row. The transversely slidable vertically tiltable frame is normally arranged in a slightly inclined position and extends downwardly and rearwardly with the rear end of the central longitudinal shaft lower than the front thereof, and should a hoe or blade of the rotary chopper come in contact with a stump or other obstruction while the machine is at work, the rear portion of the tiltable frame will swing upwardly, the slightly diamond-shaped form of the hoes or blades facilitating such operation. If anything, however, should interfere with the upward swinging of the rear portion of the frame 11 and prevent the blade or hoe from slipping over a stump or other obstruction, the friction gearing will permit the rotary chopper to remain stationary until the hoe or blade passes such obstruction. This will in a great measure prevent injury to the cotton chopper. Furthermore, the pivoting of the frame 11 independently of the main frame relieves the necks of the draft animals of the weight of the cotton chopping mechanism, and the said mechanism is adapted to be elevated while turning the machine at the end of a row, and while transferring the machine from one place or field to another by depressing the front portion. This operation may be effected by the foot of the driver, but the machine is equipped preferably at the left hand side with an upright operating handle or lever 11$^a$, having a forked or bifurcated lower portion straddling the axle and secured to the frame 11 in advance and in rear of the axle by the fastening devices 11$^b$ for securing the adjacent bearing 12 to the said frame 11.

The operating handle or lever 11$^a$, which is located within convenient reach of the driver or operator, is of sufficient length to enable the frame 11 to be easily tilted on the axle. The rotary chopper may be tilted in an elevated position while turning the machine at the end of a row and while transferring the machine from one field to another by a spring actuated catch 11$^c$ pivotally mounted on the front portion of the bracket 28 and arranged to engage the lower edge of the adjacent portion of the front tongue yoke 6, but the catch may be mounted in any other desired position either on the bracket 28, or on the laterally slidable frame, which carries the bracket. In the drawings, the catch 11$^c$ is shown pivoted at an intermediate point and provided with a lower engaging portion, which is urged forwardly by a coiled spring 11$^d$ so as to engage automatically the front portion of the main frame when the laterally slidable frame is tilted sufficiently to carry the catch into position for engaging the tongue yoke 6. The catch also has an upwardly extended portion located above the pivotal point and adapted to be readily actuated by the foot of the operator to disengage the catch from the main frame when it is desired to lower the rotary chopper to the ground. A catch of any other suitable construction may, of course, be employed for detachably locking the pivoted laterally shiftable frame rigid with the main frame for maintaining the rotary chopper in an elevated position.

The frame 11 is shiftable laterally to enable the operator to guide the cotton chopping mechanism to arrange it to operate properly on irregular rows without changing the direction of the machine to secure this result. For this purpose, the machine is equipped at one side with an upright lever 50, pivoted at an intermediate point to the lateral extension 10 of the adjacent side of the tongue yoke 6, and connected at its lower end by a bolt 51 or other suitable pivot to the outer end of a transversely disposed link or bar 52, extending inwardly to the depending U-shaped portion 22ª of the transverse bar 22 and connected with the same. The link or bar 52 is provided at an intermediate point with a quarter bend to arrange its inner portion in a plane approximately at right angles to its outer portion to enable the inner end 53 of the link to be conveniently connected to a projecting loop 54, preferably formed by a staple and linked into a perforation of the said end 53. The upper end of the lever 50 is shaped into a handle, and it is adapted to be conveniently grasped by the operator, and when the lever 50 is oscillated the frame 11 and the cotton chopping mechanism carried by the same will be shifted transversely of the machine, the sides of the tongue yoke 6 being spaced apart a sufficient distance to provide the necessary lateral adjustment of the frame 11, and the rear U-shaped portion 7 of the main frame arching the frame 11 to clear the same.

The blades or hoes of the rotary chopper may be removed to enable the machine to be converted into a harrow, and for this purpose the machine is equipped with a rotary soil engaging device, comprising a ring 55 and an annular series of harrow teeth 56, secured at their inner portions to the ring 55 and projecting rearwardly therefrom. The ring 55, which is flat to fit against the disk 36, is provided at intervals with perforations 57, adapted to register with some of the perforations of the disk 36 to enable the rotary soil engaging device to be bolted to the same. The harrow teeth may be mounted on the disk 36 in any other suitable manner. The spaced harrow teeth of the rotary soil engaging device are adapted to run across a row of plants, and in practice they will be properly positioned to operate in the spaces between the plants, and in this manner the harrow will be adapted to clean a row of plants of grass and weeds better than an ordinary harrow and with the said rotary soil engaging device, grass and weeds may be reached, which are entirely inaccessible with an ordinary harrow. Also the rotary soil engaging device may be advantageously employed for breaking the crust when the same forms on the ground after the planting of seed and before the same are up. Instead of employing the harrow teeth of the form illustrated in Fig. 7 of the drawings, any other suitable soil engaging element, such as a blade or shovel, may be used.

What is claimed is:—

1. A machine of the class described, including an axle, a main frame carried by the axle, a rotary device, a tiltable frame pivotally mounted on the axle and carrying the rotary device and arranged to swing freely upwardly and downwardly independently of the main frame to adjust the rotary device automatically to the character of the ground, said tiltable frame being also slidable transversely along the axle, gearing connecting the rotary device with the axle and slidable along the latter, and operating mechanism connected with the said frames for sliding the tilting frame along the axle.

2. A machine of the class described including a main frame provided with a tongue located at one side of the center of the machine, a seat mounted on the main frame and located at the opposite side of the center of the machine, a tiltable frame arranged to swing upwardly and downwardly independently of the main frame, cotton chopping mechanism carried by the tiltable frame, and a handle fixed to the tiltable frame at one side thereof adjacent to the said seat.

3. A machine of the class described, including an axle, a main frame carried by the axle, cotton chopping mechanism, an independently movable tiltable frame, pivotally mounted on the axle and arranged to tilt upwardly and downwardly freely to automatically adjust the cotton chopping mechanism to the character of the ground, said movable tiltable frame being also slidable along the axle, a longitudinal shaft mounted on the tilted frame in rear of the axle, gearing for connecting the longitudinal shaft with the axle, said gearing being slidable along the axle with the tiltable frame, a rotary device on the rear portion of the longitudinal shaft, and a gage carried by the rear portion of the tiltable frame and arranged to run on the ground.

4. A machine of the class described including an axle, a main frame mounted on the axle and provided in advance of the same with a tongue and having a seat located in rear of the axle, a tiltable frame pivotally mounted on the axle and movable freely upwardly and downwardly automatically independently of the main frame to adjust the machine to the character of the ground, said tiltable frame being also slidable along the axle, a rotary device carried by the tiltable frame and located in rear of the axle, gearing for transmitting motion from the axle to the rotary device, said gearing being slidable along the axle with the tiltable frame and a gage mounted on the tiltable frame at the rear portion thereof and arranged to run on the ground.

5. A machine of the class described including an axle, a main frame mounted on the axle, a tiltable frame pivoted to the said axle and arranged to swing upwardly and downwardly independently of the main frame to adjust the machine to the character of the ground, said tiltable frame being also slidable on the axle transversely of the machine, a rotary device carried by the tiltable frame in its pivotal and sliding movements, gearing for transmitting motion from the axle to the rotary device, and a gage bar adjustably secured to and extending downwardly from the tiltable frame and provided with a rearwardly extending lower portion or foot arranged to run on the ground.

6. A machine of the class described including an axle, a main frame mounted on the axle, an independently movable tiltable frame pivotally mounted on the axle, a longitudinal shaft mounted on the tiltable frame in rear of the axle, a rotary device carried by the said shaft, gearing for transmitting motion from the axle to the shaft, said gearing including a shiftable element, a bracket carried by and depending from the tiltable frame at the front portion thereof, an operating lever fulcrumed on the bracket, and means for connecting the operating lever with the shiftable element of the gearing.

7. A machine of the class described including an axle, a main frame mounted on the axle, an independently movable tiltable frame pivotally mounted on the axle, a longitudinal shaft supported by the tiltable frame in rear of the axle, a rotary device carried by the said shaft, gearing for transmitting motion from the axle to the shaft, said gearing including a shiftable element, a bracket carried by the tiltable frame and having a depending portion located at the front thereof, an operating lever fulcrumed on the bracket, a link or bar connecting the lever with the shiftable element of the gearing, and a relatively fixed guide bar receiving and guiding the lever in the pivotal movement of the same.

8. A machine of the class described including an axle, a main frame carried by the axle, a tiltable frame mounted on the axle and movable upwardly and downwardly independently of the main frame, said tiltable frame extending in advance and in rear of the axle and slidable along the same and having one of its portions heavier than the other, a rotary device carried by the heavier portion of the tiltable frame, gearing for operating the rotary device, and a gage carried by the said heavier portion of the tiltable frame and arranged to run on the ground to limit the downward movement of the said rotary device, said gage being adapted to permit the tiltable frame to adjust itself to the character of the ground.

9. A machine of the class described including an axle, an open main frame mounted on the axle and having an upwardly extending approximately U-shaped rear portion arranged at an inclination, a seat carried by the rear portion of the main frame, an independently movable tiltable frame mounted on the axle within the main frame and arched by the rear portion of the latter, a rotary device carried by the rear portion of the tiltable frame, and gearing for operating the said rotary device.

10. A machine of the class described including an axle, a main frame carried by the axle, a tiltable frame movable upwardly and downwardly independently of the main frame and having spaced sides, a gear wheel mounted on the axle and provided at one side with an extended hub portion supporting one side of the tiltable frame, said gear being provided at the opposite side with a sleeve extending across the tiltable frame and supporting the other side thereof, a rotary device carried by the tiltable frame, and means for transmitting motion from the gear wheel to the rotary device.

11. A machine of the class described including an axle, a main frame carried by the axle, a tiltable frame movable upwardly and downwardly independently of the main frame and having spaced sides, a gear wheel slidably mounted on the axle and provided at one side with an extended hub portion supporting one side of the tiltable frame, said gear being provided at the opposite side with a sleeve extending across the tiltable frame and supporting the other side thereof, a rotary device carried by the tiltable frame, means for transmitting motion from the gear wheel to the rotary device, and operating means mounted on the main frame and connected with the tiltable frame for sliding the same along the axle.

12. A machine of the class described including an axle, a main frame carried by the axle, a tiltable frame movable upwardly and downwardly independently of the main frame, a vertical gear wheel slidably mounted on the axle, a transverse bar connecting the sides of the tiltable frame and having a depending approximately U-shaped portion extending around the lower portion of the gear wheel, a longitudinal shaft supported by the tiltable frame and the said transverse bar, a pinion mounted on the longitudinal shaft and coacting with the said gear wheel, a rotary device also mounted on the longitudinal shaft, an operating lever fulcrumed on the main frame, and means for connecting the operating lever with the said U-shaped portion of the transverse bar for sliding the tiltable frame along the axle.

13. A machine of the class described including a main frame provided with a seat, an axle supporting the main frame, an automatically tiltable frame pivotally mounted on the axle and slidable along the axle transversely of the machine, a handle or lever fixed to the tiltable frame and adapted to swing the same on the axle, operating means mounted on the main frame and connected with the tiltable frame for sliding the latter along the axle, a rotary device carried by the tiltable frame, and gearing for transmitting motion from the axle to the rotary device.

14. A machine of the class described including a main frame provided with a seat, an axle supporting the main frame, a tiltable frame slidably and pivotally mounted on the axle, a handle or lever fixed to the tiltable frame for swinging the same on its pivot, a longitudinal shaft carried by the tiltable frame, gearing connecting the shaft with the axle, a rotary device mounted on the shaft, and a catch for locking the tiltable frame to the main frame for supporting the rotary device in an elevated position.

15. A machine of the class described including a main frame provided with a seat, an axle supporting the main frame, a tiltable frame slidably and pivotally mounted on the axle and adapted to swing upwardly and downwardly independently of the main frame to adjust the machine to the character of the ground, a longitudinal shaft carried by the tiltable frame, gearing connecting the shaft with the axle, a rotary device mounted on the shaft, a catch for locking the tiltable frame to the main frame for supporting the rotary device in an elevated position, and a gage carried by the tiltable frame and arranged to run on the ground.

16. A machine of the class described including a main frame, a tiltable frame arranged to swing upwardly and downwardly independently of the main frame and shiftable transversely of the machine, a rotary device carried by the tiltable frame, operating mechanism connected with the said rotary device, and a catch mounted on the tiltable frame at the front thereof and arranged to engage the front of the main frame for locking the tiltable frame rigid with the main frame for supporting the rotary device in an elevated position.

In testimony, that I claim the foregoing as my own, I have hereto affixed my signature in the presence of two witnesses.

OSCAR BRUCE CARROLL.

Witnesses:
 JOHN WATSON,
 JEFF T. KEMP.

---

Copies of this patent may be obtained for five cents each, by addressing the "Commissioner of Patents, Washington, D. C."